United States Patent [19]

Kirschner et al.

[11] 4,139,585
[45] Feb. 13, 1979

[54] VALVE FOR THE INTRODUCTION OF GAS

[75] Inventors: Jürgen Kirschner, Cologne; Helmut Klapp, Cologne-Pesch; Rainer Rompeltien, Monheim; Otmar Zajicek, Cologne, all of Fed. Rep. of Germany

[73] Assignee: Wacker-Chemie GmbH, Munich, Fed. Rep. of Germany

[21] Appl. No.: 810,401

[22] Filed: Jun. 27, 1977

[30] Foreign Application Priority Data

Jul. 21, 1976 [DE] Fed. Rep. of Germany ....... 2632858

[51] Int. Cl.$^2$ ................................ 261 124; B01F 3/04
[52] U.S. Cl. .................................... 261/64 R; 251/325
[58] Field of Search ................. 261/64 R, 124, 121 R, 261/DIG. 47, DIG. 13, 77, 62; 251/144, 325

[56] References Cited

U.S. PATENT DOCUMENTS

| | | | |
|---|---|---|---|
| 540,870 | 6/1895 | Olds | 261/64 R |
| 878,411 | 2/1908 | Minton | 261/64 R |
| 2,158,737 | 5/1939 | Wunsch | 251/325 X |
| 2,342,602 | 2/1944 | Reitz, Jr. | 261/DIG. 47 |
| 3,015,190 | 1/1962 | Arbeit | 261/77 X |
| 3,168,595 | 2/1965 | Kibbee | 261/64 R X |
| 3,719,524 | 3/1973 | Ripley et al. | 261/DIG. 13 |
| 3,740,041 | 6/1973 | Jones | 261/64 R |
| 4,045,525 | 8/1977 | Huggins | 261/124 |

FOREIGN PATENT DOCUMENTS 1011237  6/1957  Fed. Rep. of Germany ........... 251/325

Primary Examiner—Richard L. Chiesa
Attorney, Agent, or Firm—Hammond & Littell

[57] ABSTRACT

This invention relates to a valve for the introduction of a gas into a liquid media comprising a housing, said housing having an exit port at one end, and exit port at the opposite end and a gas entrance port, said housing containing a movable hollow piston in a substantially water-tight connection with said housing, said movable hollow piston being sealed at each end and having gas distribution jets at one end, and a gas entrance port in communication with said housing gas entrance port when said hollow piston is extended, said hollow piston being in a substantially gas-tight connection with said housing when retracted, and means for extending and retracting said movable hollow piston in said housing, whereby when said hollow piston is extended, said gas distribution jets are exposed beyond said housing and a gas path is created from said gas entrance port to and through said gas distribution jets.

1 Claim, 1 Drawing Figure

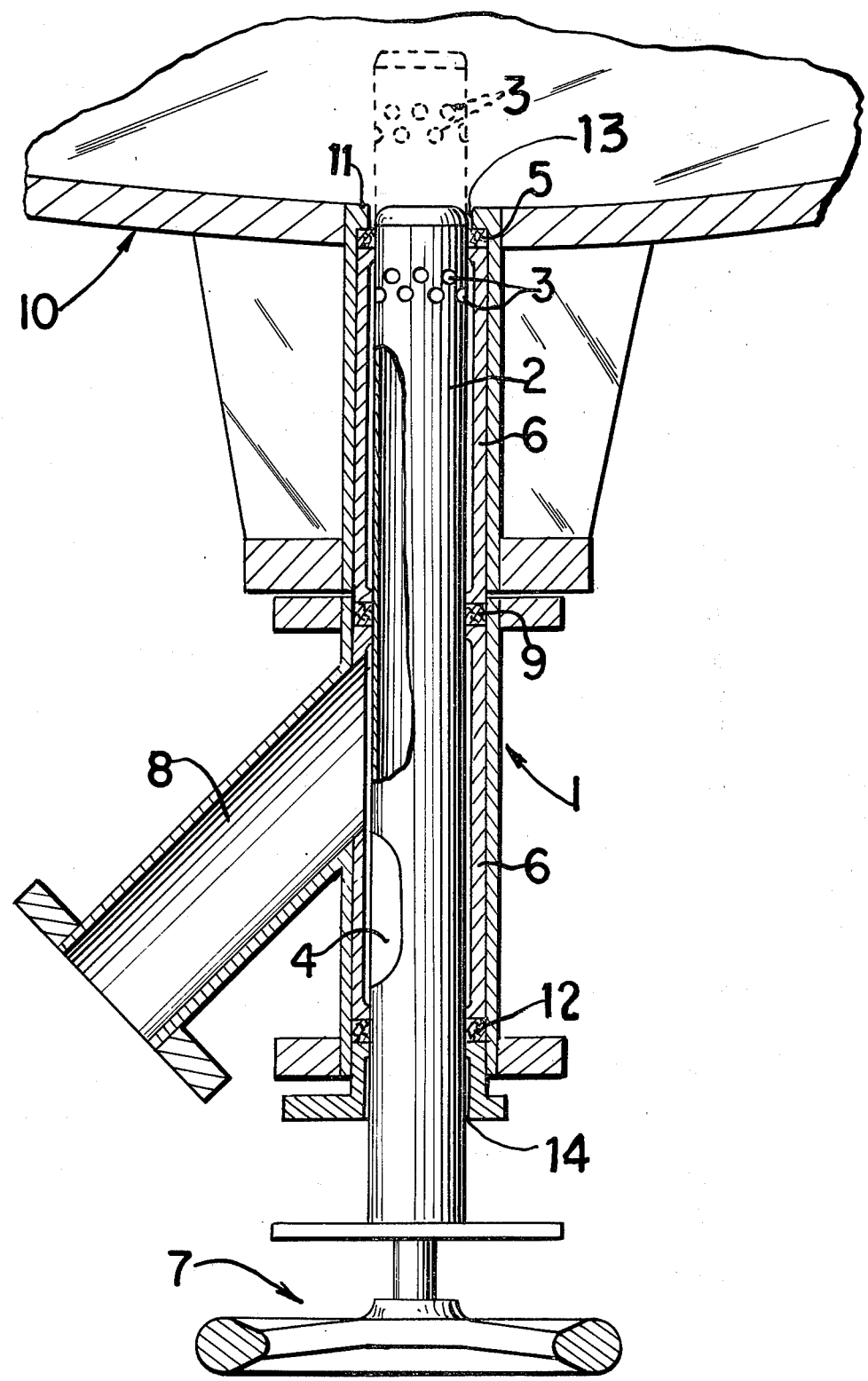

VALVE FOR THE INTRODUCTION OF GAS

BACKGROUND OF THE INVENTION

In many industrial processes, suspensions of solids in liquids are obtained which need further treatment with gases. Many of these suspensious, however, have a tendency to coagulate or deposit sediments. The gassing of suspensions is particularly effective when the gaseous phase is introduced into the liquid container from below. Problems occur, however, when the gas inlet is used discontinously. These consist in that the liquid medium in the inlet nozzle can be forced back to the shut-off valve. If the suspensions in this case are, for example, suspensions that are sensitive to coagulation or have a tendency to deposit sediment, then incrustations or deposits in the inlet nozzle must be reckoned with. As a result of these, the operational reliability of the gassing equipment is impaired. To some extent, relief can be afforded by so-called disc valves, but a fine distribution of the gas stream introduced is not possible with these, and the risk of deposits of condensate, for example, upon the introduction of water vapor, cannot be adequately suppressed.

OBJECTS OF THE INVENTION

An object of the present invention is the development of a device for introducing a gas into a liquid media that on the one hand permits an introduction of the gas without an inlet flange if possible, and on the other hand, distributes the stream of gas introduced so finely that the result is a stream of gas which is branched and as finely distributed as possible throughout the liquid media.

Another object of the present invention is the development of a valve for the introduction of a gas into a liquid media comprising a housing adapted to be attached to a liquid container, said housing having an exit port at the end adjacent said attachment, an exit port at the opposite end and a gas entrance port, said housing containing a movable hollow piston in a substantially water-tight connection with said housing, said movable hollow piston being sealed at each end and having gas distribution jets in the annular wall adjacent said housing attachment and a gas entrance port in communication with said housing gas entrance port when said hollow piston is extended, said hollow piston being in a substantially gas-tight connection with said housing when retracted, and means for extending and retracting said movable hollow piston in said housing whereby when said hollow piston is extended, said gas distribution jets are exposed beyond said housing and a gas path is created from said gas entrance port to and through said gas distribution jets.

These and other objects of the invention will become more obvious as the description thereof proceeds.

THE DRAWINGS

The FIGURE is a cross-sectional view of the valve for the introduction of a stripping gas into a suspension of the invention.

DESCRIPTION OF THE INVENTION

The purpose of the invention is to provide an operationally reliable device for the gassing of liquid media.

The subject of the invention is a valve for the introduction of gases into a liquid media, such as suspensions, consisting of a housing 1 having annular seals 5, 9 and a supporting sleeve 6, containing a hollow piston 2 which is covered at both ends and having gas distribution jets 3 at one end and a bore 4 in the piston at the other end of the cylindrical surface of the hollow piston 2, said housing having a valve drive 7 which, on opening, moves the bore 4 in the piston in alignment with the stripping gas flange 8 and moves the gas distribution jets 3 past the annular seal 5 into the suspension container 10 and which, on closing, moves the gas distribution jets 3 back into the housing 1 and closes the stripping gas flange by means of the hollow piston. Using the stripping valve according to the invention, it is possible to eliminate the problem of sedimentation or incrustation in the inlet tubes of containers holding suspensions that are sensitive to coagulation or which have a tendency to deposit sediment.

More particularly, the present invention is a valve for the introduction of a gas into a liquid media such as a suspension, comprising a housing 1 adapted to be attached to a suspension container 10, said housing 1 having an exit port 13 at the end adjacent said attachment, an exit port 14 at the opposite end and a gas entrance port 8, said housing containing a movable hollow piston 2 in a substantially water-tight connection with said housing 1, said movable hollow piston 2 being sealed at each end and having gas distribution jets 3 in the annular wall adjacent said housing attachment and a gas entrance port 4 in communication with said housing gas entrance port 8 when said hollow piston 2 is extended, said hollow piston 2 being in a substantially gas-tight connection with said housing 1 when retracted, and means 7 for extending and retracting said movable hollow piston in said housing 1, whereby when said hollow piston is extended, said gas distribution jets are exposed beyond said housing and a gas path is created from said gas entrance port to and through said gas distribution jets.

The above valve construction in the shape of an extended piston valve enables the piston to be introduced into the suspension as required, and enables the stripping gas to be finely distributed during the gassing of the suspensions by the top of the piston provided with gas distribution jets 3. When the gassing is complete, the portion of the piston inserted in the suspension is returned to its initial position again and the valve opening is tightly closed. The use of annular seal 5, a supporting sleeve 6 and a further annular seal 9 ensures that no fluid can escape out of the container into the valve. It is thereby further guaranteed that blocking or caking cannot occur in the inlet jet. Such depositions or incrustations have until now resulted in the inlet jets becoming daily unserviceable and require cleaning and, furthermore, the quality of the product has been adversely affected. Additional cleaning of the valve, as has been unavoidably necessary until now, is now no longer necessary.

Suspensions showing a tendency to form incrustations are, for example, plastic dispersions which have been prepared by polymerization in the heterogeneous phase. In this case it is, for example, frequently necessary to remove unreacted monomer from the finished polymerized batch. The removal of the monomer is particularly necessary when, as in the case of vinyl chloride, for example, substances are involved that give rise to work-hygiene problems in the further processing of the polymerization product.

Other solids dispersions frequently show a tendency to deposit sediment especially when they are treated with hot gases.

The stripping valve for blowing in stripping gases, for installation in containers, as shown in the drawing, consists substantially of the housing 1, which is extended right up to the blowing-in point 11 at the bottom of the container 10, and of the piston 2 which is sealed water-tight in the housing 1 by annular seals 5, 9 and the supporting sleeve 6. The piston 2 is sealed in gas-tight fashion in the upper part of the housing 1 by annular seals 9, 12. The piston 2 is hollow and sealed at each end, and at its upper end is provided with jet bores 3 for the distribution of the gas. In their closed state the bores 3 of the piston 2 are located below the upper seal 5 and in this manner ensure a perfect seal.

In its stripping position, the piston 2 is moved into the container 10 by means of the valve drive 7. Valve drive 7 consists of a rotatable wheel driving a shaft having a screw thread which engages the top of the housing and being connected rotatably to the hollow piston 2, in a known manner. Through the flange 8 in housing 1 by way of the bore 4 of the piston 2, the stripping gas thereby enters the cavity of the piston 2 and passes by way of the jets 3 into the container.

After the stripping has terminated, the piston 2 is returned again under the pressure of the stripping gas until the gas distribution jets 3 are within the housing 1 and until the port 4 is no longer in communication with the flange 8. At this time a substantially gas-tight seal is formed between flange 8 and the piston wall. The scraper seal 5 scrapes the liquid phase and all solid particles from the retracting piston 2 while the stripping gas still under pressure prevents the suspension from flowing back into the valve.

The preceding specific embodiment is illustrative of the practice of the invention. It is to be understood, however, that other expedients known to those skilled in the art or disclosed herein, may be employed without departing from the spirit of the invention or the scope of the appended claims.

We claim:

1. A valve for the introduction of a gas into a suspension that is sensitive to coagulation or which has a tendency to deposit sediment comprising a housing adapted to be attached to the bottom of a liquid container, said housing having an exit port at the end adjacent said attachment, an exit port at the opposite end and a gas entrance port, said housing containing a movable hollow piston in a substantially water-tight connection with said housing, said movable hollow piston being sealed at each end and having gas distribtuon jets in the annular wall adjacent said housing attachment and a gas entrance port in communication with said housing gas entrance port when said hollow piston is extended, said hollow piston being in a substantially gas-tight connection with said housing when retracted, and means for extending and retracting said movable hollow piston in said housing, whereby when said hollow piston is extended, said gas distribution jets are exposed beyond said housing and a gas path is created from said gas entrance port to and through said gas distribution jets and, when said hollow piston is retracted, said gas distribution jets are moved back into said housing.

* * * * *